United States Patent [19]

Mischke

[11] 4,056,523
[45] Nov. 1, 1977

[54] WATER-INSOLUBLE AZO DYESTUFFS
[75] Inventor: Peter Mischke, Neuenhain, Taunus, Germany
[73] Assignee: Hoechst Aktiengesellschaft, Frankfurt am Main, Germany
[21] Appl. No.: 638,909
[22] Filed: Dec. 8, 1975
[30] Foreign Application Priority Data
Dec. 9, 1974 Germany .................... 2458195
[51] Int. Cl.² ............... C09B 46/00; C09B 29/00
[52] U.S. Cl. ..................... 260/205; 260/207.1; 260/556 N; 260/556 A
[58] Field of Search ........... 260/205, 556 B, 556 A, 260/207.1

[56] References Cited
U.S. PATENT DOCUMENTS

| | | | |
|---|---|---|---|
| 2,193,015 | 3/1940 | Weissberger | 260/556 A |
| 3,206,454 | 9/1965 | Merian et al. | 260/205 |
| 3,344,133 | 9/1967 | Bossard et al. | 260/556 A X |
| 3,632,582 | 1/1972 | Bil | 260/556 B |
| 3,743,678 | 7/1973 | Halasz | 260/556 B X |
| 3,929,760 | 12/1975 | Landholm et al. | 260/556 B X |

FOREIGN PATENT DOCUMENTS 456,347   5/1949   Canada ..................... 260/556 A Primary Examiner—Allen B. Curtis
Attorney, Agent, or Firm—Curtis, Morris & Safford

[57] ABSTRACT

Novel azo dyestuffs — being water-soluble only in traces — containing in the coupling component the grouping of the formula

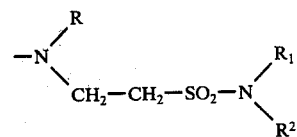

in which R represents hydrogen, lower alkyl, lower alkylene-O-CO-lower-alkyl, lower alkylene-COO-lower alkyl, cyano-lower alkyl, chloro-lower alkyl, benzyl or cyclohexyl, $R_1$ represents hydrogen, alkyl of from 3 to about 14 carbon atoms, cyanoethyl, hydroxyethyl, acetoxyethyl or benzyl, and $R_2$ represents alkyl of from 3 to about 14 carbon atoms, benzyl, phenylethyl, cyclohexyl, phenyl, methylphenyl, ethylphenyl, methoxyphenyl, ethoxyphenyl, nitrophenyl, chlorophenyl or bromophenyl, or $R_1$ and $R_2$ together with the nitrogen atom morpholinyl or piperidyl, said dyestuffs being suitable for the dyeing or printing of synthetic fibrous materials, especially consisting of linear polyesters, the dyeings or prints obtained on said materials being distinguished particularly by an excellent fastness to thermofixation.

9 Claims, No Drawings

WATER-INSOLUBLE AZO DYESTUFFS

The invention concerns novel valuable azo dyestuffs, which are water-soluble only in traces, of the general formula (1)

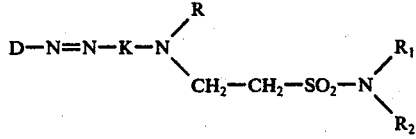

in which D represents the radical of the diazo component, which is free from water-solubilizing groups, of the aromatic or heterocyclic series, for example of the benzene, naphthalene, thiazole, benzthiazole, indazole and thiadiazole series, which may be substituted, for example, by halogen atoms such as fluorine, chlorine or bromine atoms, by nitro, cyano, alkyl, trifluoromethyl, alkoxy, phenoxy, arylazo such as phenylazo, alkylsulfonyl, acyl, such as acetyl or benzoyl, carboxylic acid alkyl ester, carboxylic acid phenyl ester, sulfamyl, N-monoalkylaminosulfonyl, N,N-dialkylaminosulfonyl, carbamyl, N-monoalkylcarbamyl and/or N,N-dialkylcarbamyl groups, whereat the beforementioned alkyl and alkoxy groups contain 1 to 4 carbon atoms each, K represents a radical of the benzene or naphthalene series or together with

a heterocyclic radical, for example a 1,2,3,4-tetrahydroquinoline, a 1,2,3,4-tetrahydrobenzoquinoline, benzomorpholine and carbazole radical, which may be substituted by non water-solubilizing groups, such as halogen atoms, for example chlorine or bromine atoms, and/or alkyl, alkoxy, phenoxy, formylamino, acetylamino, benzoylamino, ureido, chloromethylcarbonylamino, $-NH+COO-$alkyl, $-NH-CO-CH^2-CH^2-O-$alkyl, alkylsulfonyl, alkylsulfonylamino, alkenylsulfonylamino and/or arylsulfonylamino groups, such as phenylsulfonylamino groups, whereat the aforementioned alkyl, alkenyl and alkoxy groups contain 1 to 4 carbon atoms, R represents a hydrogen or an alkyl, alkylene$-$O$-$CO$-$alkyl, alkylene$-$COO$-$alkyl, cyanoalkyl, chloroalkyl, benzyl or cyclohexyl radical, whereat alkyl and alkylene groups contain 1 to 4 carbon atoms each, $R_1$ represents a hydrogen atom or an alkyl radical with 1 to 4 carbon atoms or a cyanoethyl, hydroxyethyl or acetoxyethyl radical, $R_2$ represents an alkyl radical with 3 to about 14 carbon atoms or a benzyl, phenylethyl, cyclohexyl, phenyl, methylphenyl, ethylphenyl, methoxyphenyl, ethoxyphenyl, nitrophenyl, chlorophenyl or bromophenyl radical, or $R_1$ and $R_2$ represent together with the nitrogen atom a heterocyclic radical, for example the morpholine or piperidine radical, and a process for their preparation, wherein the amine of the formula (2)

$$D-NH_2 \quad (2)$$

in which D is defined as above, is diazotized in known manner and coupled, as usual, with an azo component of the general formula (3)

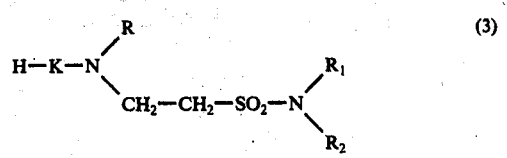

in which K, R, $R_1$ and $R_2$ are defined as above.

Under non water-solubilizing groups in the sense of the present invention there are to be understood non dissociating groups.

As amines of the diazonium compounds there can be cited: 4-nitraniline, 2-chloro-4-nitraniline, 2-bromo-4-nitraniline, 2-cyano-4-nitraniline, 2,4-dinitraniline, 2-methylsulfonyl-4-nitraniline, 2,6-dichloro-4-nitraniline, 2,6-dibromo-4-nitraniline, 2,4-dinitro-6-chloroaniline, 2,4-dinitro-6-bromoaniline, 2-cyano-4-nitro-6-chloroaniline, 2-cyano-4-nitro-6-bromoaniline, 2-cyano-4,6-dinitroaniline, 2,6-dicyano-4-nitroaniline, 4-aminoazobenzene, aniline, p-toluidine, o-anisidine, m-anisidine, p-anisidine, p-phenetidine, p-phenoxyaniline, 2-, 3- and 4-fluoroanilines, 2-, 3- and 4-chloroanilines, 2-, 3- and 4-bromoaniline, 2-, 3- and 4-trifluoromethyl-anilines, 2,4-dichloroaniline, 2,4-dibromoaniline, 2,5-dichloroaniline, 2,5-dibromoaniline, 3,4-dichloroaniline, 2,6-dichloroaniline, 2,4,5-trichloroaniline, 2,4,6-trichloroaniline, 2,4,6-tribromoaniline, 2,4-dichloro-6-nitroaniline, 2-cyano-, 3-cyano- and 4-cyano-anilines, 2,4-dicyanoaniline, 2,5-dicyano-aniline, 4-cyano-2-nitroaniline, 4-chloro- and 4-bromo-2-nitroanilines, 4-methyl-2-nitroaniline, 4-methoxy-2-nitroaniline, 4-trifluoromethyl-2-nitroaniline, 4-methyl-sulfonyl-2-nitroaniline, 2-methyl-4-nitroaniline, 2-methoxy-4-nitroaniline, anthranilic acid methyl- and ethyl esters, 3-aminobenzoic acid-methyl- and ethyl esters, 4-aminobenzoic acid-methyl- and ethyl esters, 4-aminobenzoic acid-phenyl ester, 2-, 3-, and 4-methylsulfonyl-anilines, 4-ethylsulfonyl-aniline, 2-amino-, 3-amino- and 4-amino-phenylsulfonamides, 4-aminophenylsulfonic acid-dimethylamide, 2-amino-, 3-amino- and 4-amino-acetophenones, 2-amino-, 3-amino- and 4-aminobenzophenones, 2-, 3- and 4-acetoamino-aniline, 2- and 3-nitroanilines, 2-amino-5-nitro-benzoic acid-methyl- and -ethyl esters, 2-amino-5-nitro-phenylsulfonamide, 2-acetamino-4-nitroaniline, 2-trifluoromethyl-4-nitroaniline, 2-chloro-6-methoxy-4-nitroaniline, 2-amino-3-chloro-5-nitrobenzoic acid methyl ester, 2-methylsulfonyl-6-chloro-4-nitroaniline, 2-trifluoromethyl-6-chloro-4-nitroaniline, 2-amino-3-methoxy-5-nitro-benzoic acid methyl ester, 2-cyano-6-methoxy-4-nitroaniline, 2,4-dinitro-6-methoxy-aniline, 2-amino-3-cyano-5-nitro-benzoic acid-methyl ester, 2-amino-3,5-dinitrobenzoic acid-methyl ester, 2-amino-3-bromo-4-nitro-benzoic acid-methyl ester, 2-cyano-6-methylsulfonyl-4-nitroaniline, 2-methylsulfonyl-4,6-dinitroaniline, 2-cyano-6-trifluoromethyl-4-nitroaniline, 2,4,6-trinitroaniline, 2-trifluoromethyl-4,6-dinitroaniline, 2-aminothiazole, 5-nitro-2-aminothiazole, 5-carbethoxy-2-aminothiazole, 5-cyano-2-aminothia-zole, 2-aminobenzthiazole, 6-nitro-2-aminobenzthiazole, 6-cyano-2-aminobenzothiazole, 6-methylsulfonyl-2-aminobenzthiazole, 6-chloro-2-aminobenzthiazole, 6-methyl-2-aminobenzthiazole, 6-methoxy-2-aminobenzthiazole, 3-amino-5-nitro-2,1-benzisothiazole, 2-amino-1,3,4-thiadiazole and 3-aminoindazole.

Particularly valuable novel dyestuffs which derive from the abovementioned formula (1) are those of the general formula (4)

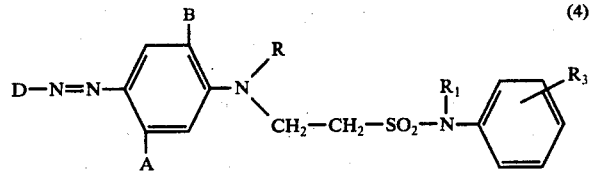

in which D, R and $R_1$ are defined as above,
A stands for a hydrogen atom, a chlorine or bromine atom or an alkyl, alkoxy, alkylsulfonyl, ureido, acetylamino, benzoylamino, alkylsulfonylamino, alkenylsulfonylamino or phenylsulfonylamino radical, whereat alkyl, alkenyl and alkoxy groups contain 1 to 4 carbon atoms each, B stands for a hydrogen, chlorine or bromine atom or for an alkyl or alkoxy radical, each containing 1 to 4 carbon atoms, or for a phenoxy radical, $R_3$ represents hydrogen or chlorine atom or the nitro, methyl or methoxy group. The azo components of the general formula (3) which are used in the process of the invention can be obtained, for example, according to the following scheme, whereat K, R, $R_1$ and $R_2$ are defined as above:

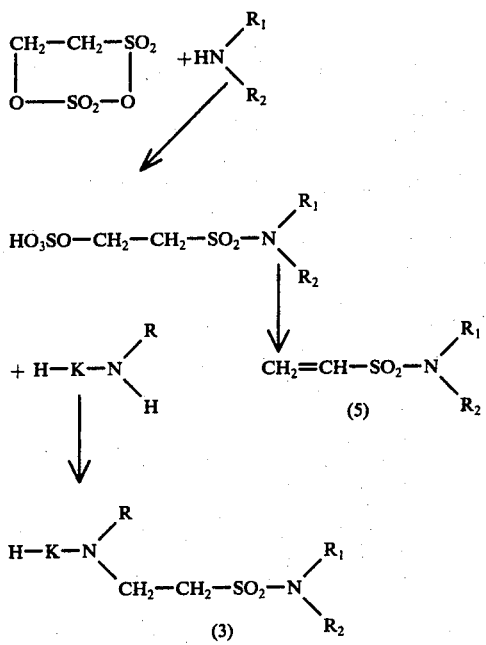

The vinylsulfonamides of the general formula (5) used can easily be obtained in known manner by reaction of carbylsulfate with amines (German Pat. Nos. 832,149, 1,176,647, 1,181,204 and 1,217,948). The addition of the vinylsulfonamides (5) to aromatic amines with formation of the azo components of the general formula (3) is effected in analogy to the addition of acrylonitrile to aromatic amines with the aid of acid catalysts such as, for example acetic acid, $ZnCl_2$ or $AlCl_3$.

The preparation of the dyestuff is effected in a generally known manner by coupling in acid to neutral, preferably in aqueous medium, optionally with addition of solvents such as, for example, lower alcohols, acetone or glacial acetic acid and additions of acid-binding agents such as sodium acetate or similar agents, buffer substances or catalysts which influence the speed of the coupling reaction such as, for example, pyridine or dimethylformamide. The novel dyestuffs which are obtained in form of water-insoluble, crystalline substances are, for example, separated by filtration and liberated from adhesive electrolytes by washing with water.

It is also possible to use a mixture of two or more diazo components, instead of a uniform diazo component, the same is true for azo components. Mixtures of dyestuffs which have differently substituted sulfonamide groups suit also very well.

The novel dyestuffs, prepared according to the invention, are suitable as such or in mixture, either in mixture between themselves or in mixture with other dyestuffs, preferably in pre-prepared form such as, for example, in aqueous dispersion or in solution in organic solvents or in emulsion or dispersion, which may contain also water, besides a solvent or a mixture of solvents, for dyeing and printing of synthetic fiber materials such as, for example, those of cellulose-di-, 2½- and triacetate; polyamides such as poly-ε-caprolactam or polyhexamethylenediamine-adipate, polyurethanes, polyolefines, polycarbonates but especially polyesters such as polyethyleneterephthalates. For dyeing and printing with the dyestuffs of the invention, the before-mentioned synthetic fiber materials can also be used in mixture between themselves or in mixture with natural fiber materials such as cellulose fibers or wool. Furthermore, they can be used in different processing stages such as, for example, as fabrics, knit fabrics, slubbings, flocks, filaments, cables or fleeces. The new dyestuff yield on the beforementioned synthetic fiber materials bright dyeings with very good fastness properties to wet, to sublimation, to exhaust gas and to light, presenting a good to very good uniform colour build-up.

Of particular practical importance is the excellent behaviour of the dyestuffs of the invention in thermofixation processes. The dyeings are for example extremely resistant to the influence of the different permanent-press processes. It is also possible to add the new dyestuffs to spinning batches and to prepare in this way so-called spin dyed filaments and fibers. However, the new dyestuffs are preferably used in aqueous dispersion. The dyeing of the wool part of polyester-wool-mixed fabrics can easily be removed by washing with emulsifiers or by a treatment with reducing agents.

When comparing the dyestuffs of the invention with the next comparable dyestuffs of the German Offenlegungsschriften Nos. 1,816,511, 1,901,485, 1,902,883, 1,917,691 and 1,941,375 it can be observed that the new dyestuffs have a higher affinity to the beforementioned synthetic fibers, which results, compared with the already known dyestuffs, in an essentially better affinity and a more advantageous colour build-up. The superiority of the dyestuffs of the invention is presumably due to the presence of homopolar substituents on the sulfonamide nitrogen of the azo components, i.e. the radicals $R_1$ and $R_2$ of the general formula (1), whilst the abovementioned already known dyestuffs have an unsubstituted or polar-groups-substituted sulfonamide group in the azo components.

Furthermore, the dyestuffs of the invention are technically and economically better accessible, as they can be prepared with primitive and generally accessible starting products in a technically more advantageous process.

Compared with the already known dyestuffs of the German Offenlegungsschriften No. 1,061,284 and 1,619,457, which contain in the azo components an inverted sulfonamide group, the dyestuffs of the invention excel, inter alia, by their clearly better fastness to light.

The application of the dyestuffs of the invention is effected in a known manner, generally from an aqueous dispersion but also from organic solvents. The dispersion of the dyestuffs can be effected, for example, by grinding in presence of a dispersant such as, for example, the condensation product of formaldehyde and a naphthalene sulfonic acid. The dyeing conditions depend to a large extent on synthetic fiber materials used and on their stage of manufacture.

The dyeing of shaped articles of cellulose acetate is, for example, effected at temperatures varying between 75° and 85° C. Cellulose triacetate fibers are dyed at temperatures between about 90° and 125° C. The application of the dyestuffs on polyamide fiber materials is effected between about 90° and 120° C.

In order to obtain intense dyeings on polyester fibers it is advantageous to add a swelling agent to the dyeing bath such as, for example, o- or p-phenylphenol, methylnaphthalene or salicylic acid methyl ester and to process at temperatures of about 100° to 130° C. But it is also possible to dye without using carriers at higher temperatures, for example, between 120° and 140° C.

Furthermore it is also possible to proceed in such a way that the dyestuff is applied by padding with or without thickener, for example tragacanth thickening, and fixed with heat, for example with steam or dry heat, during ½ to 30 minutes at temperatures of about 100° to 230° C. For the amelioration of the fastness to rubbing of the so-dyed material it is advantageous to eliminate the dyestuff adhering on the surface, for example, by rinsing or by a reductive after-treatment.

This aftertreatment is generally effected in a bath at 60° to 120° C, containing an aqueous caustic soda solution, sodium dithionite and a non ionogenic detergent, such as for example an ethyleneoxide-phenol-addition product. For dyeing the synthetic fiber materials from organic solvents, it is possible to proceed, for example, so that at room temperature or above, preferably at about 70° to 130° C, optionally under pressure, the dyestuff is absorbed on the fiber, or in such a way, that in a continuous working process fabrics or knitted fabrics are impregnated with a dyestuff solution, dried and treated with heat, for example at temperatures between 180° and 210° C. As solvents for the exhaust process there can be cited, for example, solvents not mixable with water, having a boiling point between 40° and 170° C, such as the aliphatic halogen hydrocarbons, such as methylenechloride, trichloroethane, trichloroethylene, perchloroethylene or trifluorotrichloroethane. Particularly convenient for a continuous dyeing process are also solvents, mixable with water, for example alcohols or dimethylformamide. The solvents can also be used as mixtures and can contain other auxiliaries soluble in solvents such as, for example, oxalkylating products of fatty alcohols, alkyl-phenols and fatty acids.

For the preparation of prints on synthetic fiber materials, for example of polyester, polyamides or cellulose triacetate, it is possible to use the dyestuffs of the invention in form of their aqueous preparations, which can contain, besides the finely dispersed dyestuff, suitable thickeners and fixing promotors. The fixation is effected, for example, after printing and drying by steaming at atmospheric pressure or under elevated pressure up to 2.5 atmg. during 10 to 60 minutes. The fixation can also be achieved by utilizing hot air of 160° to 210° C during 30 seconds to 10 minutes.

EXAMPLE 1

Dyestuff of the formula

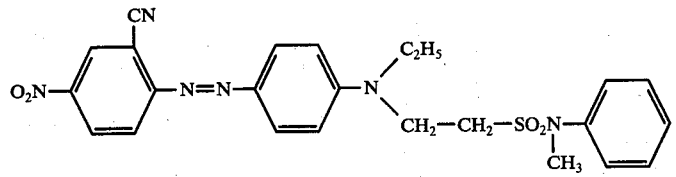

a. Preparation of the azo component:

12.1 g (0.1 mol) of N-ethylaniline and 19.7 g (0.1 mol) of N-methyl vinylsulfonilide were heated under reflux until boiling together with 20 ml of an aqueous acetic acid at 50% for 6 – 8 hours. The reaction was followed-up by thin layer chromatography. The product of the reaction was not isolated after the reaction but it was used in this form as azo component.

If the product of the reaction has to be put in a stage free from insignificant soilings, the warm mixture was poured onto ice water and the precipitated substance was crystallized from petroleum ether. Melting point: 85° - 87° C.

b. Preparation of the dyestuff:

16.3 g (0.1 mol) of 2-cyano-4-nitroaniline were dissolved at 0° to 10° C in 70 g of a 98% sulfuric acid and subsequently diazotized at the same temperature by addition of 32 g of a 40% by weight nitrosyl sulfuric acid. Stirring was continued for 2 hours at about 5° C until the end of the reaction.

The diazo solution was added dropwise to the azo component obtained according to process a), which was brought to reaction with about 50 ml of 2N hydrochloric acid. The temperature was kept at this stage at 5° C to 10° C by adding about 500 g of ice. For the completion of the coupling process, a buffering with 4N sodium acetate was effected and stirring was continued for 2 hours. The precipitated dyestuff of the above cited formula was suction-filtered, washed with water until free from salt and acid and subsequently dried.

The dyestuff yielded on polyester or cellulose triacetate fibers ruby red dyeings and prints with excellent fastness properties.

EXAMPLE 2:

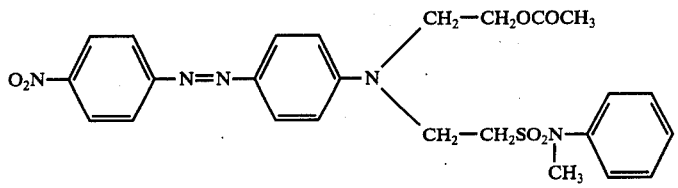

a. Preparation of the azo component:

A mixture composed of 13.6 g (0.1 mol) of N-β-hydroxyethylaniline and 19.7 g (0.1 mol) of N-methyl-vinysulfanilide was brought to reaction with about 10 ml of glacial acetic acid and heated during 8 to 10 hours up to 120° to 130° C. The reaction was followed-up by thin layer chromatography. Towards the end of the reaction, 12 g of acetanhydride were added for esterification and heating was continued for further 2 hours up to 80° to 90° C. The product of the reaction was used as azo component without intermediate isolation. For cleaning and analysis it was possible to separate the substance in crystalline form in ice-water and to recrystallize it from petroleum ether. Melting point: 70° – 72° C.

b. Preparation of the dyestuff:

13.8 g (0.1 mol) were dissolved by heating in 80 ml of 5N hydrochloric acid and poured, whilst stirring, into a mixture of 500 ml of water, 20 ml of 5N aqueous sodium nitrite solution and 250 g of ice. The so-obtained diazo solution was slowly added to the azo component, obtained according to process a), which reacted with about 50 ml of 2N hydrochloric acid. For the completion of the coupling process, stirring was continued for 3 hours at about 10° C and the pH value was adjusted at 5 with the aid of sodium acetate. The precipitated dyestuff of the abovementioned formula was suction-filtered, washed with water until free from electrolytes and dried. This dyestuff yielded on polyester-, cellulose triacetate- and cellulose acetate fibers very clear orange dyeings with very good fastness properties, especially exellent properties to thermofixation.

EXAMPLE 3

Dyestuff of the formula

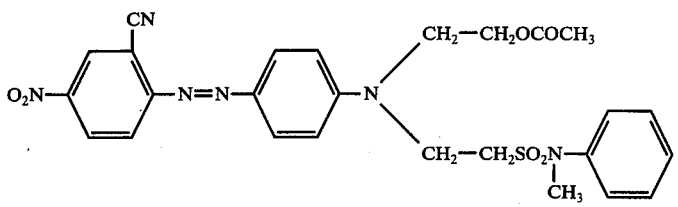

a. Preparation of the azo component:

A mixture of 13.6 g (0.1 mol) of N-β-hydroxyethylaniline and 19.7 g (0.1 mol) of N-methyl-vinylsulfanilide was brought to reaction with about 10 ml of glacial acetic acid and heated for 8 – 10 hours up to 120° – 130° C. The reaction was followed up by a thin layer chromatography. Towards the end of the reaction, 12 g of acetanhydride were added for the esterification and heated up to 80° – 90° C during further 2 hours. The product of the reaction was used as azo component without intermediate isolation. For cleaning and analysis it is possible to separate the substance in crystalline form in ice-water and to recrystallize it from petroleum ether. Melting point: 70° – 72° C.

b. Preparation of the dyestuff:

16.3 (0.1 mol) of 2-cyano-4-nitroaniline were dissolved at 0° to 10° C in 70 g of a sulfuric acid at 98% and subsequently diazotized at the same temperature by addition of 32 g of nitrosyl sulfuric acid at 40% by weight. For the completion of the reaction stirring is continued for 2 hours at about 5° C. The diazo solution was added dropwise to the azo component obtained according preparation a), brought to reaction with about 50 ml of 2N hydrochloric acid. This temperature was kept at 5° – 10° C by addition of about 500 g of ice. For the completion of the coupling, the mixture was subsequently buffered with a 4N sodium acetate solution and stirring was continued for 2 hours. The precipitated dyestuff of the above formula was suction-filtered, washed with water until free from salt and acid and dried.

The dyestuff yields on polyester, cellulose acetate and cellulosetriacetate fibers neutral red dyeings and prints with excellent fastness properties. Blue-tinged red dyeings were obtained on polyamide fibers.

EXAMPLE 4

Dyestuff of the formula

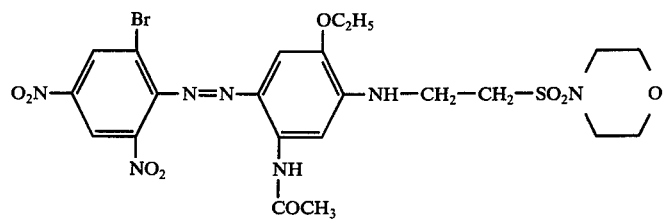

a. Preparation of the azo component: A mixture of 19.4 g (0.1 mol) of 2-aminophenacetine and 17.7 g (0.1 mol) of vinylsulfonmorpholide was heated under reflux in 40 ml of an aqueous acetic acid of 50% strength for 12 hours up to boiling temperature. After completion of the reaction, followed-up by thin layer chromatography, the mixture of the reaction was used as azo component, without isolation.

b. Preparation of the dyestuff:

26.2 g (0.1 mol) of 2,4-dinitro-6-bromoaniline were dissolved in 80 ml of conc. sulfuric acid and diazotized at 5° C with 32 g of a nitrosyl sulfuric acid at 40%. For the completion of the diazotation, stirring was continued for 2 hours at about 15° C. The diazo solution was added dropwise to the azo component prepared according to a) and brought to reaction with 50 ml of concentrated hydrochloric acid. By addition of 500 g of ice, the temperature was kept at 5° C during 2 hours. The dyestuff of the above-mentioned formula, separated by crystallisation, was suction-filtered, washed until neutral and dried.

Marine blue dyeings and prints on polyester fibers with very good fastness properties were obtained, especially an excellent fastness to thermofixation. Clear, blue shades were obtained on polyamide fibers.

EXAMPLE 5:

Dyestuff of the formula

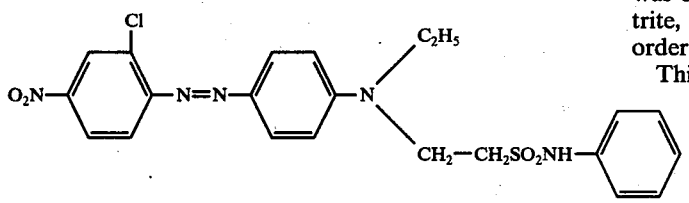

a. Preparation of the azo component:

12.1 g (0.1 mol) of N-ethylaniline and 18.3 g (0.1 mol) of vinysulfanilide were brought into reaction with about 1 g of zinc chloride and heated 3 hours up to 130° to 140° C. When the thin layer chromatography indicated that the reaction was completed, the molten mass was cooled and brought into reaction with about 50 ml of 5N hydrochloric acid. The so obtained solution was then directly used as azo component.

b. Preparation of the dyestuff:

17.2 g (0.1 mol) of 2-chloro-4-nitroaniline were stirred into 40 ml of concentrated hydrochloric acid and 60 ml of water. After cooling to 0° to 5° C, 20 ml of an aqueous sodium nitrite solution were added and the diazotation was completed after a 1 hour's stirring. The diazo solution was poured at 0° – 5° C into the solution of the azo component obtained according to process a). The coupling was completed by buffering with sodium acetate. The precipitated dyestuff of the above formula, isolated in the usual way, yielded in finely dispersed form red dyeings and prints with rather good fastness properties on polyester-, cellulose triacetate- and polyamide fibers.

EXAMPLE 6:

Dyestuff of the formula

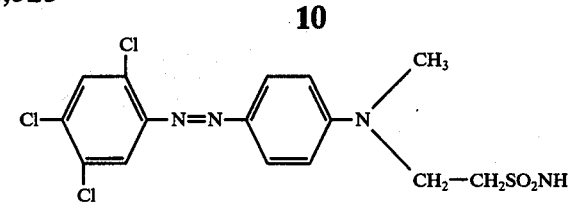

a. Preparation of the azo component:

12.1 g (0.1 mol) of N-methylaniline and 18.3 g (0.1 mol) of vinylsulfanilide were brought into reaction with about 1 g of zinc chloride and heated during 3 hours up to 130° to 140° C. When the thin layer chromatography indicated that the reaction was completed, the molten mass was cooled and brought into reaction with about 50 ml of 5N hydrochloric acid. The so-obtained solution was then directly used as azo component.

b. Preparation of the dyestuff:

19.65 g (0.1 mol) of 2,4,5-trichloroaniline were stirred into 40 ml of concentrated hydrochloric acid and 60 ml of water. After cooling to 0° to 5° C, the diazotation was effected with 20 ml of an aqueous 5N sodium nitrite, stirring was continued for about 30 minutes in order to complete the reaction.

This diazo solution was slowly poured into the solution of 29 g of N-methyl-N-phenyl-taurianilide, in 5N hydrochloric acid (azo component), prepared according to process a); the coupling was completed by buffering with sodium acetate. The dyestuff was isolated and dried in the usual way and yielded in finely dispersed form clear, golden yellow dyeings and prints with rather good fastness properties, especially with fastness to thermofixation, on polyester-, cellulose acetate-, cellulose triacetate- and polyamide fibers.

EXAMPLE 7

Dyestuff of the formula

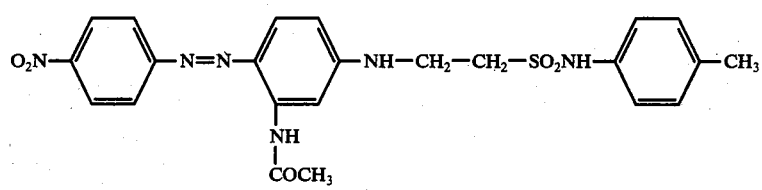

a. Preparation of the azo component:

A mixture of 15 g (0.1 mol) of 3-aminoacetanilide and 19.7 g (0.1 mol) of vinylsulfonic acid-p-toluidide in 30 ml of an aqueous acetic acid at 50% were heated under reflux during 5 to 7 hours. When cooling, the mixture was diluted with about 100 ml of 2N hydrochloric acid; the solution was used as azo component.

b. Preparation of the dyestuff:

13.8 g (0.1 mol) of 4-nitroaniline were dissolved by heating in 80 ml of 5N hydrochloric acid and poured under stirring into a mixture of 500 ml of water, 20 ml of an aqueous 5N sodium nitrite solution and 250 g of ice.

The diazo solution was then added dropwise to the azo component prepared according process a). For the completion of the coupling, stirring was continued at about 10° C for about 2 hours; the pH value was adjusted with sodium acetate at 6. The precipitated dyestuff of the above formula, prepared as usual yields on polyester fibers very clear, yellowish red dyeings with good fastness to light and an excellent fastness to thermofixation.

EXAMPLE 8:

Dyestuff of the formula

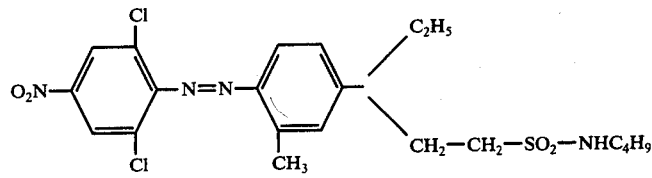

a. Preparation of the azo component:

A mixture of 13.5 g of 3-(N-ethylamino)-toluene and 16.3 g (0.1 mol) of vinylsulfonic acid-n-butylamide was heated under reflux until boiling in 30 ml of an aqueous acetic acid at 50% during 5 to 7 hours. When cooling, the mixture was diluted with about 100 ml of 2N hydrochloric acid; the solution was then used as azo component.

b. Preparation of the dyestuff:

20.7 g (0.1 mol) of 2,6-dichloro-4-nitroaniline were dissolved in 80 ml of concentrated sulfuric acid and diazotized at 5° C with 32 g of nitrosyl sulfuric acid at 40%. Stirring was continued for 2 hours for the completion of the diazotation.

The diazo solution was added dropwise to the beforementioned azo component and dissolved in 50 ml of concentrated hydrochloric acid. By addition of about 500 g of ice, the temperature was kept at about 5° C. The coupling was completed after 2 - 3 hours. The dyestuff of the above formula prepared in the usual way, yielded on polyester fibers brown dyeings and prints with good fastness properties.

EXAMPLE 9

Dyestuff of the formula

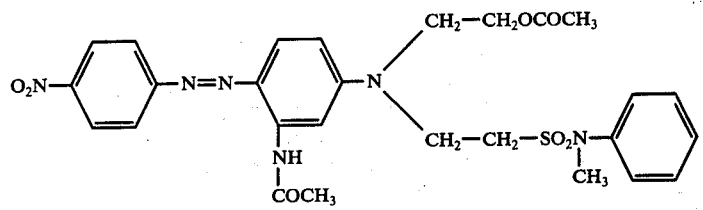

a. Preparation of the azo component:

A mixture of 30 g (0.2 mol) of 3-aminoacetanilide and 39.4 g (0.2 mol) of vinylsulfonic acid-N-methyl-anilide were heated under reflux until boiling for about 5 - 7 hours in 30 ml of an aqueous acetic acid of 50% strength. After the usual reaction with ethylene-oxide and after the esterification with acetanhydride, the azo component was dissolved in a mixture of glacial acetic acid and 2N hydrochloric acid.

b. Preparation of the dyestuff:

13.8 g (0.1 mol) of 4-nitroaniline were dissolved by heating in 80 ml of 5N hydrochloric acid and poured under stirring in a mixture of 500 ml of water, 20 ml of 5N aqueous sodium nitrite solution and 250 g of ice. The so-obtained diazo solution was added dropwise to half of the beforementioned azo component (a). After buffering with sodium acetate and a 2 hours stirring, the dyestuff was isolated and dried as usual. It yields on polyester - and cellulose triacetate fibers very clear, red dyeings and prints with very good fastnesses to light and to thermofixation.

EXAMPLE 10

Dyestuff of the formula

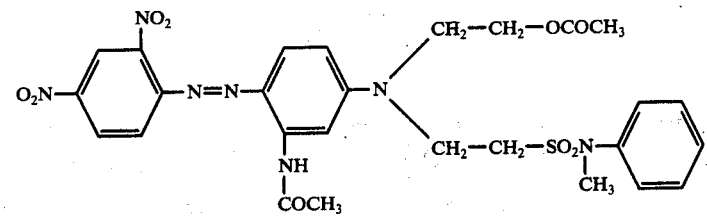

a. Preparation of the azo component:

A mixture of 15 g (0.1 mol) of 3-aminoacetanilide and 19.7 g (0.1 mol) of vinylsulfonic acid-N-methyl-anilide were heated under reflux during 5 to 7 hours in an aqueous acetic acid of 50% strength. After the usual reaction with ethylene-oxide and after esterification with acetanhydride, the azo component was dissolved in a mixture of glacial acetic acid and 2N hydrochloric acid.

b. Preparation of the dyestuff:

18.3 g (0.1 mol) of 2,4-dinitroaniline were dissolved in 60 ml of concentrated sulfuric acid and diazotized under cooling to 15° C with 32 g of nitrosyl sulfuric acid at 40%. Stirring was continued for 2 hours for the completion of the reaction.

The so-obtained diazo solution was added dropwise to the azo component solution prepared according to (a). The reaction was then buffered by adding sodium acetate.

The so-obtained dyestuff of the beforementioned formula yielded on polyester materials violet dyeings with very good fastness to sublimation.

The following table contains further dyestuffs which could be obtained by diazotation of the diazo components shown in column 2 according to the indications contained in the abovementioned examples, brought into reaction with the azo components shown in column 3. The shade is indicated in column 4 which can be obtained with the dyestuffs on fiber materials indicated in column 5 (PES means polyester, CT means cellulose triacetate, CA means cellulose acetate and PA polyamide).

| Ex. No. | diazo component | azo component | shade | fiber |
|---|---|---|---|---|
| 11 | 2-Cl-4-$O_2N$-aniline | $C_6H_5$-N($C_2H_5$)-$C_2H_4SO_2NH$-$C_6H_4$-$CH_3$ (4) | red | PES CT |
| 12 | 2-CN-4-$O_2N$-aniline | 2-Cl-$C_6H_4$-$NHC_2H_4SO_2$-N($CH_3$)-$C_6H_5$ | orange | PES CT |
| 13 | 2-Cl-4-$O_2N$-6-$NO_2$-aniline | 2-$OCH_3$-5-$NHCOCH_3$-$C_6H_3$-$NHC_2H_4SO_2$-N($C_2H_5$)-$C_6H_5$ | reddish blue | PES |
| 14 | 2-CN-4-$O_2N$-6-$NO_2$-aniline | 2-$OCH_3$-5-$NHCOCH_3$-$C_6H_3$-N($CH_3$)-$C_2H_4SO_2$-NH-$C_6H_4$-$OCH_3$ (4) | greenish blue | PES |
| 15 | 2-amino-5-nitro-thiazole (or analogue) | 2-$OCH_3$-5-$NHCOCH_3$-$C_6H_3$-$NHC_2H_4SO_2$-N(piperidine) | blue | PES |
| 16 | 2-Br-4-$O_2N$-aniline | 3-(NH-$COOC_2H_5$)-$C_6H_4$-N($CH_3$)-$C_2H_4SO_2NH$-$C_6H_5$ | red | PES |
| 17 | 2-$NO_2$-4-$O_2N$-aniline | 3-$CH_3$-$C_6H_4$-N($CH_3$)-$C_2H_4SO_2NH$-$C_6H_4$-$CH_3$ (4) | bluish red | PES CT |
| 18 | 2,6-$Cl_2$-4-$O_2N$-aniline | $C_6H_5$-N($C_2H_5$)-$C_2H_4SO_2$-N($C_2H_4CN$)-$C_6H_5$ | yellow brown | PES |

-continued

| Ex. No. | diazo component | azo component | shade | fiber |
|---|---|---|---|---|
| 19 | 2,4,5-trichloroaniline | N-ethyl-N-(2-acetoxyethyl)-3-methyl-phenyl coupled with N-methyl-N-phenyl-2-(phenylsulfonyl)ethylamine derivative | golden-yellow | PES CT PA |
| 20 | 2-amino-3-nitro-5-cyanobenzene | N-(2-methoxycarbonylethyl)-N-phenyl, N-methyl-N-cyclohexyl-2-sulfonylethylamine | red | PES CT |
| 21 | 2-amino-3-nitro-5-chlorobenzene | N-(2-acetoxyethyl)-3-(acetylamino)phenyl, N-methyl-N-phenyl-sulfonylethylamine | red | PES |
| 22 | 2-amino-3-cyano-5-nitrobenzene | N-(2-acetoxyethyl)-3-(acetylamino)phenyl, N-methyl-N-phenyl-sulfonylethylamine | violet | PES |
| 23 | 4-nitroaniline | N-(2-acetoxyethyl)-3-(acetylamino)phenyl, N-phenyl-sulfonylethylamine | yellowish red | PES |
| 24 | 4-nitroaniline | N-methyl-3-(acetylamino)phenyl, N-phenyl-sulfonylethylamine | red | PES CT |
| 25 | 2-amino-3-cyano-5-nitrobenzene | N-methyl-3-(acetylamino)phenyl, N-phenyl-sulfonylethylamine | violet | PES CT PA |
| 26 | 2-amino-3-methylsulfonyl-5-nitrobenzene | 3-methylphenyl-NHC$_2$H$_4$SO$_2$NH-cyclohexyl | bluish red | PES |
| 27 | 2-amino-3-cyano-5-nitrobenzene | 3-chlorophenyl-NHC$_2$H$_4$SO$_2$N(CH$_3$)-phenyl | red | PES |
| 28 | 2-amino-3-cyano-5-nitrobenzene | 2,5-dichlorophenyl-NHC$_2$H$_4$SO$_2$N(CH$_3$)-CH$_2$-phenyl | orange | PES CT |

-continued
| Ex. No. | diazo component | azo component | shade | fiber |
|---|---|---|---|---|
| 29 | 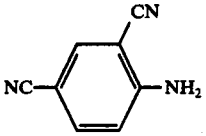 | 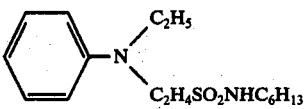 | scarlet | PES |
| 30 | 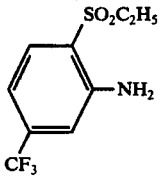 | 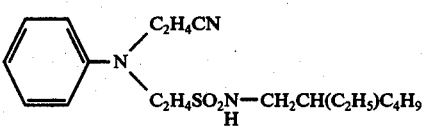 | orange | PES |
| 31 | 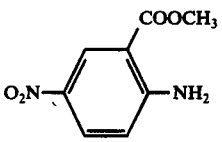 | 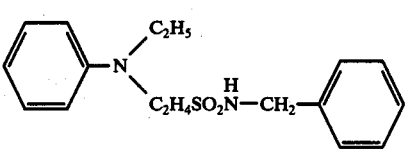 | orange | PES |
| 32 | 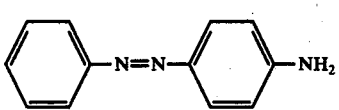 | 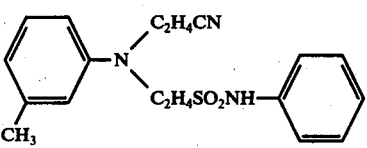 | orange-red | PES CA |
| 33 | 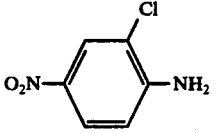 | 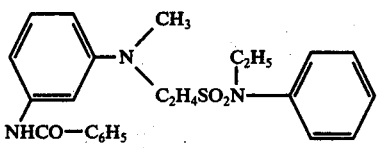 | red | PES |
| 34 | 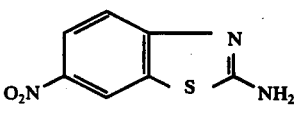 | 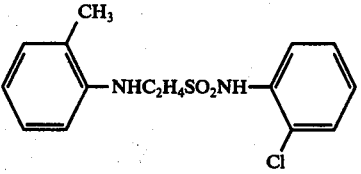 | red | PES |
| 35 | 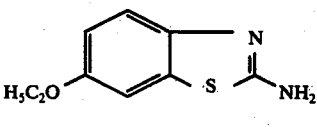 | 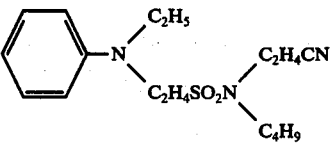 | yellowish red | PES |
| 36 | 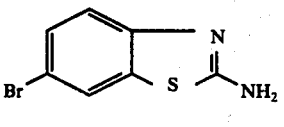 | 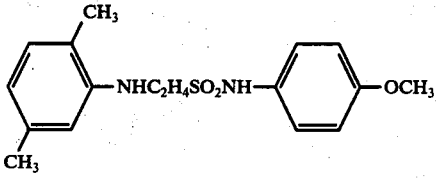 | red | PES PA |
| 37 | 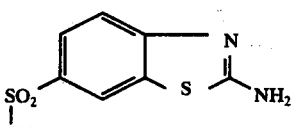 | 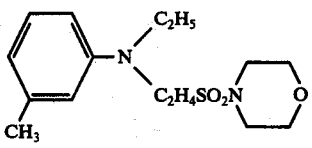 | ruby | PES |
| 38 | 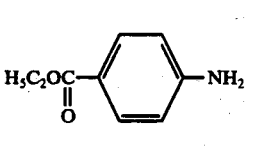 | 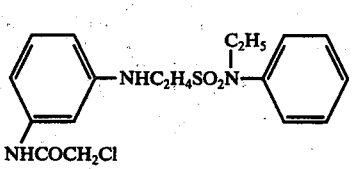 | golden yellow | PES CT |

-continued
| Ex. No. | diazo component | azo component | shade | fiber |
|---|---|---|---|---|
| 39 | 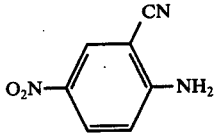 | 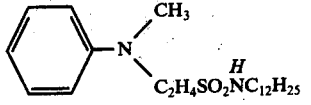 | bluish red | PES CT |
| 40 | 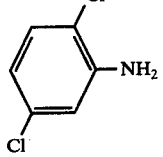 | 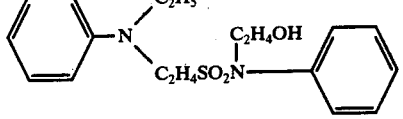 | golden yellow | PES |
| 41 | 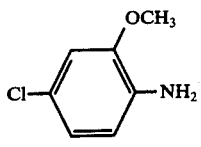 | 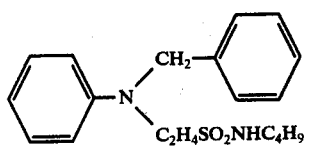 | yellowish orange | PES |
| 42 | 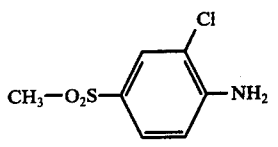 | 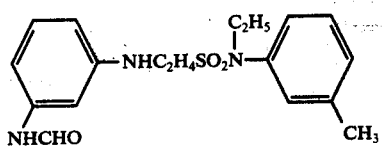 | scarlet | PES |
| 43 | 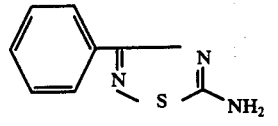 | 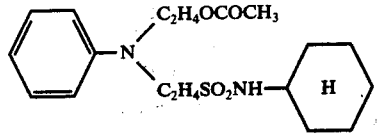 | scarlet | PES |
| 44 | 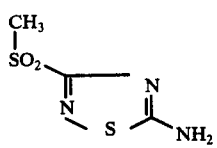 | 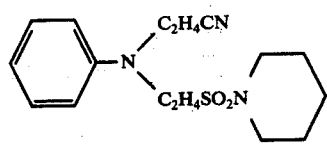 | scarlet | PES |
| 45 | 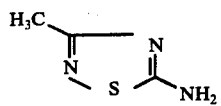 | 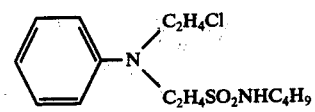 | orange | PES |
| 46 | 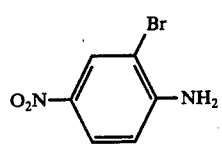 | 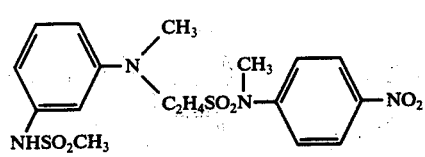 | red | PES |
| 47 | 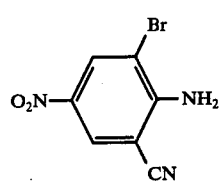 | 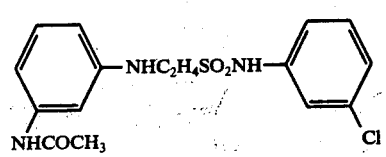 | reddish blue | PES |
| 48 | 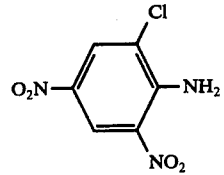 | 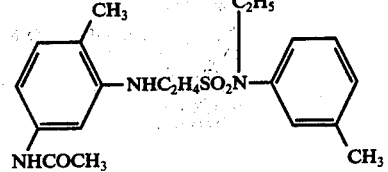 | violet | PES |

| Ex. No. | diazo component | azo component | shade | fiber |
|---|---|---|---|---|
| 49 | 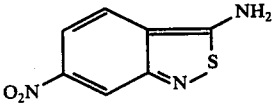 | 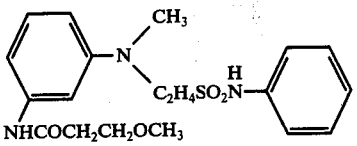 | greenish blue | PES CT |
| 50 | 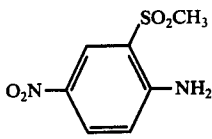 | 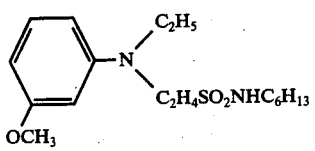 | reddish violet | PES |
| 51 | 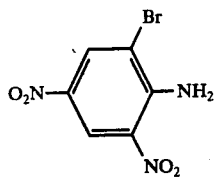 | 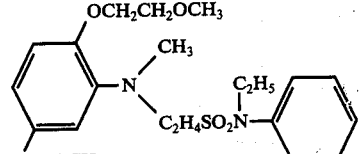 | greenish blue | PES |
| 52 | 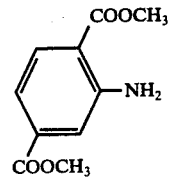 | 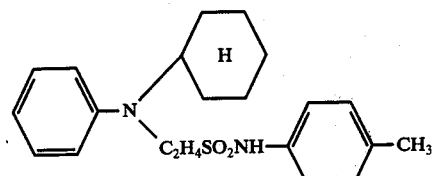 | orange | PES CT |
| 53 | 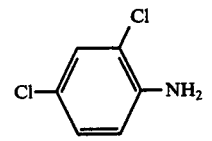 | 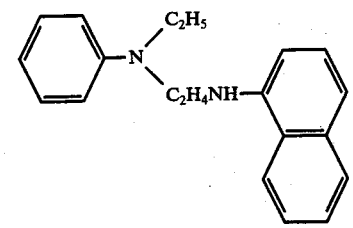 | reddish yellow | PES |
| 54 | 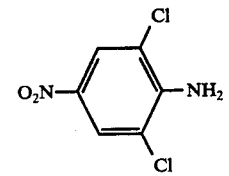 | 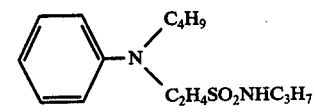 | brown | PES CA |
| 55 | 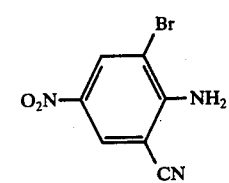 | 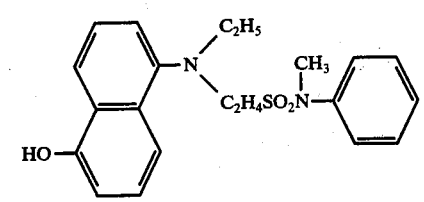 | blue | PES CT |
| 56 | 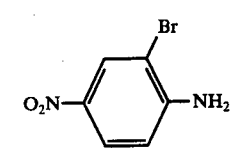 | 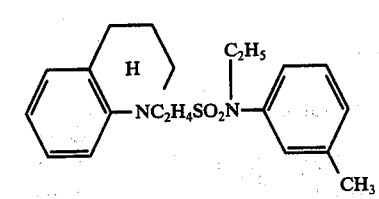 | red | PES |

| Ex. No. | diazo component | azo component | shade | fiber |
|---|---|---|---|---|
| 57 | O₂N—⟨⟩—NH₂ | [carbazole with NC₂H₄SO₂N(CH₃)(phenyl)] | orange | PES |
| 58 | O₂N—⟨⟩(CN)—NH₂ | ⟨⟩(OCH₃)—NHC₂H₄SO₂NH—⟨⟩ | red | PES |
| 59 | O₂N—⟨⟩(CN)—NH₂ | ⟨⟩(OCH₃)(CH₃)—N(C₂H₅)(C₂H₄SO₂NH—⟨⟩H) | violet | PES |
| 60 | O₂N—⟨⟩(Cl)—NH₂ | ⟨⟩(NHCOOC₂H₅)—N(C₂H₄OCOCH₃)(C₂H₄SO₂N(C₄H₉)₂) | red | PES |
| 61 | H₃C—⟨⟩(NO₂)—NH₂ | ⟨⟩(CH₃)—NHC₂H₄SO₂NH—⟨⟩(NO₂) | yellow orange | PES |
| 62 | ⟨⟩—N=N—⟨⟩—NH₂ | ⟨⟩(Cl)—N(CH₃)(C₂H₄SO₂N(CH₃)(phenyl)) | orange red | PES CT |

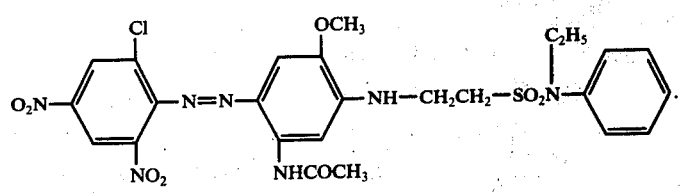

I claim:
1. Novel azo dyestuffs-being water-soluble only in traces - of the formula

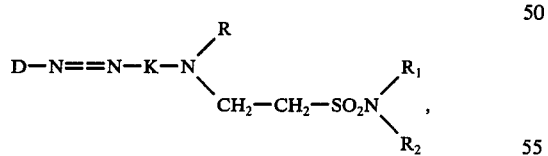

in which
D as the radical of a diazo component represents nitrophenylene, carbo-lower alkoxy-phenylene, dinitrophenylene, nitro-cyano-phenylene, nitro-chloro-phenylene, nitro-bromo-phenylene, nitro-lower alkylsulfonyl-phenylene, nitro-carbo-lower alkoxy-phenylene, di(cyano)phenylene, trifluoro-lower alkylsulfonyl-phenylene, dichlorophenylene, chloro- lower alkoxy-phenylene, chloro- lower alkylsulfonyl-phenylene, di(nitro)-bromophenylene, trichlorophenylene, dichloro-nitro-phenylene, dinitro-chloro-phenylene, phenylazo-phenylene, di(carbo-lower alkoxy)phenylene, nitro- lower alkyl-phenylene, nitro-trifluoromethyl-phenylene or nitro-bromo-cyano-phenylene, K represents phenylene, lower alkylphenylene, lower alkoxyphenylene, chlorophenylene acetylamino-phenylene, benzoylamino-phenylene, lower alkyl-sulfonylamino-phenylene, formylamino-phenylene, chloroacetylamino-phenylene, carbo-lower alkox-yamino-phenylene, lower alkyl- lower alkoxyphenylene, lower alkyl-acetylamino-phenylene, di(-lower alkyl)phenylene, dichlorophenylene, lower alkoxy-lower alkylene—CO—NH—phenylene, lower alkoxy-acetylamino-phenylene or hydroxynaphthylene, R represents hydrogen, lower alkyl, lower alkylene-O—CO—lower alkyl, lower alkylene—COO—lower alkyl, cyano-lower alkyl, chloro-lower alkyl, benzyl or cyclohexyl, R₁, represents hydrogen, alkyl of from 3 to about 14 carbon atoms, cyanoethyl, hydroxyethyl, acetoxyethyl or benzyl, and R₂ represents alkyl of from 4 to about 14 carbon atoms, benzyl, phenylethyl, cyclohexyl, phenyl, methylphenyl, ethylphenyl, methoxyphenyl, ethoxyphenyl, nitrophenyl, chlorophenyl or bromophenyl.

2. The dyestuff of the formula

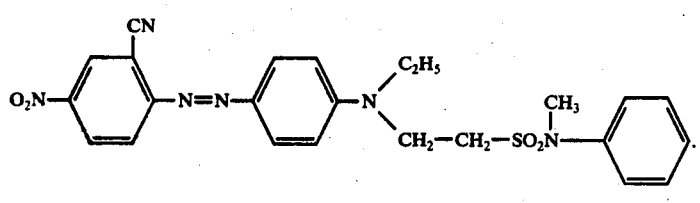

3. The dyestuff of the formula

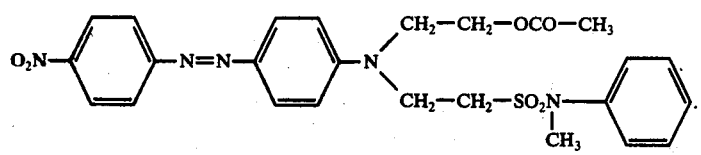

4. The dyestuff of the formula

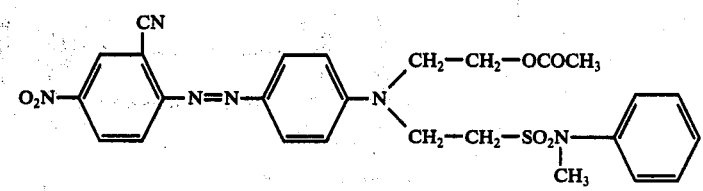

5. The dyestuff of the formula

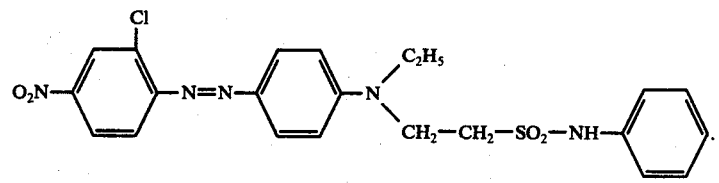

6. The dyestuff of the formula

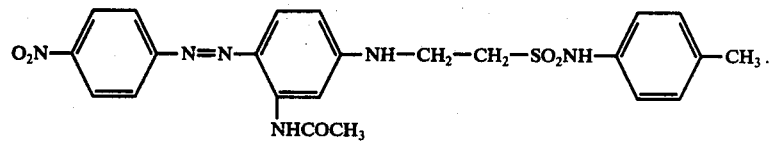

7. The dyestuff of the formula

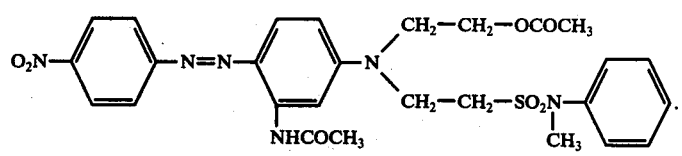

8. The dyestuff of the formula

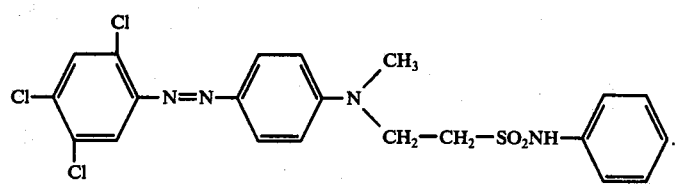

9. The dyestuff of the formula